United States Patent
Fan (10) Patent No.: US 11,557,920 B2
(45) Date of Patent: Jan. 17, 2023

(54) WIRELESS POWER RECEIVING DEVICE, WIRELESS CHARGING METHOD AND SYSTEM

(71) Applicant: BEIJING XIAOMI MOBILE SOFTWARE CO., LTD., Beijing (CN)

(72) Inventor: Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 401 days.

(21) Appl. No.: 16/696,131

(22) Filed: Nov. 26, 2019

(65) Prior Publication Data

US 2021/0036551 A1 Feb. 4, 2021

(30) Foreign Application Priority Data

Aug. 1, 2019 (CN) .......................... 201910706107.0

(51) Int. Cl.
*H02J 50/12* (2016.01)
*H02J 7/00* (2006.01)
*H02J 7/02* (2016.01)

(52) U.S. Cl.
CPC .......... *H02J 50/12* (2016.02); *H02J 7/00304* (2020.01); *H02J 7/00308* (2020.01); *H02J 7/02* (2013.01); *H02J 2207/20* (2020.01)

(58) Field of Classification Search
CPC ..................................... H02J 50/12
USPC ....................................... 320/108
See application file for complete search history.

(56) References Cited

U.S. PATENT DOCUMENTS

| 9,928,391 | B1 | 3/2018 | Simons |
| 2020/0099257 | A1* | 3/2020 | Qiu ...................... H01M 10/46 |

FOREIGN PATENT DOCUMENTS

| CN | 104218632 A | 12/2014 |
| CN | 105406606 A | 3/2016 |
| CN | 108233453 A | 6/2018 |
| CN | 108233456 A | 6/2018 |
| CN | 108233507 A | 6/2018 |
| CN | 108718103 A | 10/2018 |
| CN | 108988426 A | 12/2018 |
| CN | 109038694 A | 12/2018 |
| CN | 109148990 A | 1/2019 |

(Continued)

OTHER PUBLICATIONS

English version of International Search Report in Application No. PCT/CN2019/110472, dated Apr. 29, 2020.

(Continued)

*Primary Examiner* — Eric D Lee
(74) *Attorney, Agent, or Firm* — Syncoda LLC; Feng Ma (57) ABSTRACT

A wireless power receiving device includes: a wireless power receiving coil, an AC-DC circuit, a capacitor buck circuit, and a battery, wherein the capacitor buck circuit includes at least two capacitors and a switch; an output terminal of the wireless power receiving coil is connected to an input terminal of the AC-DC circuit, and an output terminal of the AC-DC circuit is connected to an input terminal of the capacitor buck circuit, and an output terminal of the capacitor buck circuit is connected to the battery; in a case that the switch is in a first connection state, the at least two capacitors are in a series state and store energy; and in a case that the switch is in a second connection state, the at least two capacitors are in a parallel state and release energy.

13 Claims, 8 Drawing Sheets

(56) References Cited

FOREIGN PATENT DOCUMENTS

| EP | 3599695 A1 | 1/2020 |
|---|---|---|
| JP | 2008125198 A | 5/2008 |
| JP | 2017022953 A | 1/2017 |
| JP | 2018201278 A | 12/2018 |
| RU | 2487452 C1 | 7/2013 |
| RU | 2654527 C1 | 5/2018 |

OTHER PUBLICATIONS

International Search Report in /PCT/2019/110472 dated Apr. 29, 2020.
Extended European search report of counterpart EP application No. 19218233.5 dated Mar. 5, 2020.
Shiquan Fan, et al., "A Reconfigurable Multi-Ratio Charge Pump with Wide Input Output Voltage Range for Wireless Energy Harvesting System," IEEE; 2018.
Office Action in RU2019141294 dated Apr. 2, 2020.
CN first office action in Application No. 201910706107.0, dated Mar. 1, 2022.

* cited by examiner

WIRELESS POWER RECEIVING DEVICE, WIRELESS CHARGING METHOD AND SYSTEM

CROSS-REFERENCE TO RELATED APPLICATION

This application claims priority to Chinese Patent Application No. 201910706107.0 filed on Aug. 1, 2019, the disclosure of which is hereby incorporated by reference in its entirety.

BACKGROUND

Wireless charging is generally applied to charging a plurality of mobile terminals such as a mobile phone, a tablet, a notebook computer, a smart watch, or the like, or charging from a main body portion to an accessory (such as a Bluetooth headset, a display screen, etc.) in a smart terminal.

The wireless charging typically involves a wireless charging device and a wireless power receiving device. During charging, the wireless power receiving device receives energy transmitted by the wireless charging device, and converts the energy into a charging voltage and a charging current.

SUMMARY

The present disclosure relates generally to the field of wireless charging, and more specifically to a wireless power receiving device, a wireless charging method, and a wireless charging system.

Various embodiments of the present disclosure provide a wireless power receiving device, a wireless charging method and a wireless charging system. The technical solution is as follows.

According to a first aspect of the embodiments of the present disclosure, a wireless power receiving device is provided, including: a wireless power receiving coil, an AC-DC circuit, a capacitor buck circuit, and a battery, wherein the capacitor buck circuit includes at least two capacitors and at least one switch;

an output terminal of the wireless power receiving coil is connected to an input terminal of the AC-DC circuit, and an output terminal of the AC-DC circuit is connected to an input terminal of the capacitor buck circuit, and an output terminal of the capacitor buck circuit is connected to the battery;

when the at least one switch is in a first connection state, the at least two capacitors are in a series state and store energy; and when the at least one switch is in a second connection state, the at least two capacitors are in a parallel state and release energy.

According to another aspect of the present disclosure, a wireless charging method is provided, including:

a wireless power receiving coil receiving energy transmitted by a wireless charging device, and outputting the energy to an AC-DC circuit in a form of alternating current;

the AC-DC circuit converting the alternating current into a direct current, and outputting the direct current to a capacitor buck circuit, wherein the capacitor buck circuit includes at least two capacitors and at least one switch;

the capacitance buck circuit controlling the at least one switch to a first connection state, wherein the at least two capacitors are in a series state and store energy when the at least one switch is in a first connection state;

the capacitance buck circuit controlling the at least one switch to a second connection state, wherein the at least two capacitors are in a parallel state when the at least one switch is in a second connection state and output energy in a form of output current to the battery.

According to another aspect of the present disclosure, a wireless charging system is provided, including a wireless charging device and a wireless power receiving device, wherein the wireless power receiving device includes the wireless power receiving device according to the embodiments described above.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the present disclosure are only adopted for the purpose of describing specific embodiments but not intended to limit the present disclosure. "First" "second" and similar terms used in the specification and claims of the present application are not to represent any sequence, number or importance but only to distinguish different parts. Likewise, similar terms such as "a/an" and "the" also do not represent a number limit but represent "at least one". Terms like "include" or "comprise" refer to that an element or object appearing before "include" or "comprise" covers an element or object and equivalent thereof listed after "include" or "comprise" and does not exclude another element or object. It is also to be understood that term "and/or" used in the present disclosure refers to and includes one or any or all possible combinations of multiple associated items that are listed.

A wireless charging process is a process of charging a wireless power receiving device with a wireless charging device, wherein the wireless charging device includes a wireless charging coil, the wireless power receiving device includes a wireless power receiving coil, and the wireless charging coil and the wireless power receiving coil are coupling coils that transfer energy through coupling between the coils.

Figure 1:
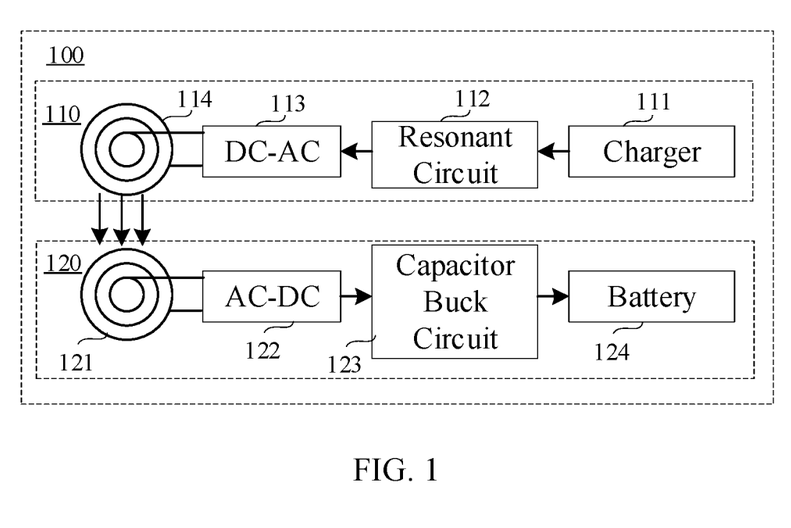
FIG. 1 is a structural block diagram of a wireless charging system according to an exemplary embodiment of the present disclosure.

FIG. 1 is a structural block diagram of a wireless charging system according to an exemplary embodiment of the present disclosure. As shown in FIG. 1, the wireless charging system 100 includes a wireless charging device 110 and a wireless power receiving device 120. The wireless charging device 110 includes a charger 111, a resonant circuit 112, and a direct current-alternating current (DC-AC) circuit 113 and a wireless charging coil 114. The wireless power receiving device 120 includes a wireless power receiving coil 121, an alternating current-direct current (AC-DC) circuit 122, a capacitor buck circuit 123, and a battery 124.

The various circuits, device components, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

In the wireless charging device 110, an output terminal of the charger 111 is connected to an input terminal of the resonant circuit 112, an output terminal of the resonant circuit 112 is connected to an input terminal of the DC-AC circuit 113, and an output terminal of the DC-AC circuit 113 is connected to the wireless charging coil 114.

In the wireless power receiving device 120, an output terminal of the wireless power receiving coil 121 is connected to an input terminal of the AC-DC circuit 122, and an output terminal of the AC-DC circuit 122 is connected to an input terminal of the capacitor buck circuit 123, and an output terminal of the capacitor buck circuit 123 is connected to the battery 124.

The charger 111 is connected to the power source and configured to receive energy in the power source and outputs the energy in a form of current. The resonant circuit 112 is configured to convert and control the current output from the charger, and control the current voltage in a preset range according to the voltage requirement. The DC-AC circuit 113 is configured to convert the direct current output from the resonant circuit 112 into an alternating current for output. The wireless charging coil 114 is configured to convert the alternating current into energy and output it to the wireless power receiving coil 121 in the wireless power receiving device 120. In some embodiments, the wireless charging coil 114 may be a coupling coil capable of generating a magnetic coupling, a coupling coil capable of generating an electric field coupling, or a coil capable of transmitting a radio wave, which is not limited in the present disclosure. The energy emitted by the wireless charging coil 114 includes, but is not limited to, energy in a form of electromagnetic waves, microwaves, and the like.

The wireless power receiving coil 121 is configured to receive the energy transmitted by the wireless charging coil 114 of the wireless charging device 110, and output the energy in a form of alternating current to the AC-DC circuit 122. After the AC-DC circuit 122 converts the alternating current into a direct current, the direct current is input to the capacitor buck circuit 123. The capacitor buck circuit 123 is configured to control the storage and release of energy through the capacitor and the switch, thereby compressing the voltage of the direct current and correspondingly increasing the current of the direct current. As an example, by controlling at least two connection states with at least one switch, that is, controlling at least two capacitors to be in a series state or in a parallel state through different connection states of the switch, storing energy when at least two capacitors are in a series state and releasing energy when at least two capacitors are in a parallel state, it can achieve voltage compression and current increase. In some embodiments, when the at least one switch is in the first connection state, the at least two capacitors are in a series state and store energy; when the at least one switch is in the second connection state, the at least two capacitors are in a parallel state and release energy. As an example, by a capacitor and a switch in the capacitor buck circuit, the voltage of the direct current is compressed to a quarter of the voltage input to the capacitor buck circuit, and the current of the direct current is increased to four times of the input current. In some embodiments, the capacitor buck circuit 123 inputs the converted direct current to the battery 124 to implement charging of the battery 124.

It should be noted that, in the above embodiment, an integral wireless charging system 100 is taken as an example. In actual operation, the wireless charging device 110 and the wireless power receiving device 120 can be regarded as two independent entities.

Accordingly, when the wireless power receiving device according to the embodiment of the present disclosure converts an alternating current into a direct current in the AC-DC circuit, and lowers the voltage of the direct current, through at least two capacitors and at least one switch in the capacitor buck circuit, the device controls processes of the at least two capacitors storing energy and releasing energy according to the connection states of the switch. It can avoid the problem of energy loss caused by the impedance of the inductor itself, and can improve the energy conversion efficiency and the charging efficiency in wireless charging.

The wireless power receiving device according to the embodiment of the present disclosure can charge a battery by converting a higher voltage into a voltage within a range that a battery can accept by means of a capacitor buck circuit, thereby when charging a wireless power receiving device, it can charge the battery with a reasonable voltage and a higher current after lowering voltage through the capacitor buck circuit, improving the charging efficiency in wireless charging.

Figure 2:
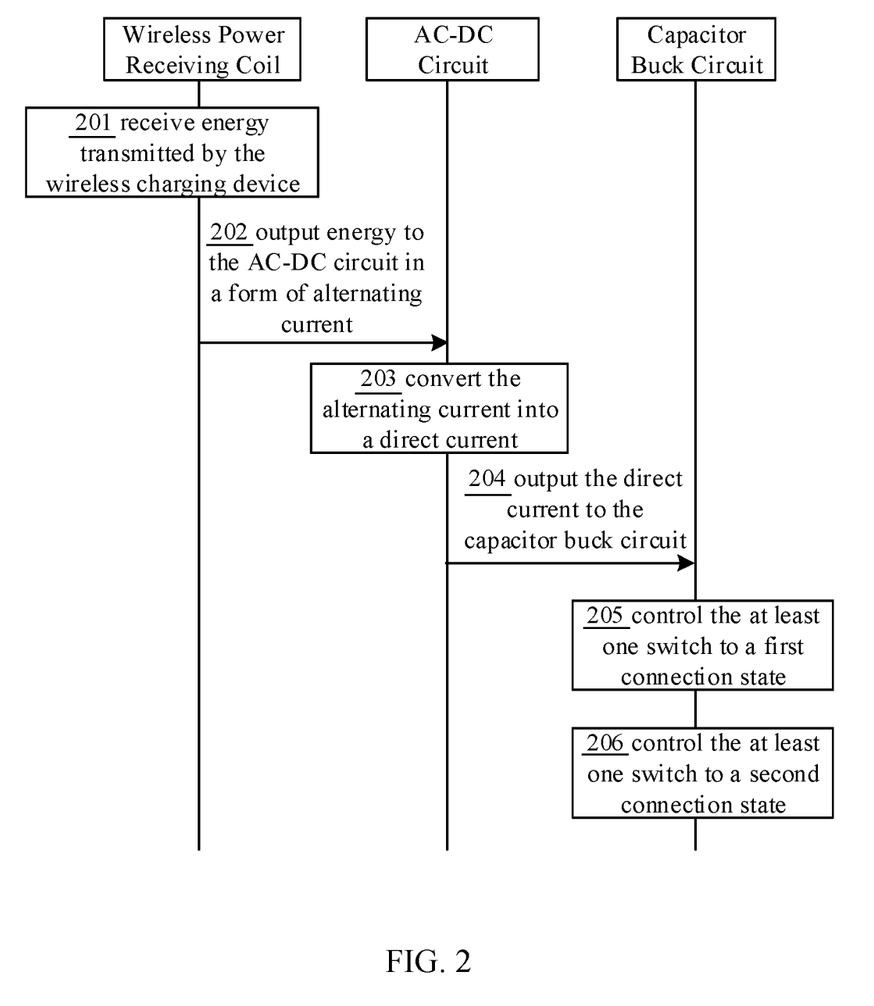
FIG. 2 is a flowchart of a wireless charging method according to an exemplary embodiment of the present disclosure.

Based on the structure of the wireless power receiving device 120, FIG. 2 is a flowchart of a wireless charging method according to an exemplary embodiment of the present disclosure. As shown in FIG. 2, the method includes the following steps.

In step 201, the wireless power receiving coil receives energy transmitted by the wireless charging device.

In some embodiments, the wireless power receiving coil may be a coupling coil capable of generating a magnetic coupling, a coupling coil capable of generating an electric field coupling, or a coil capable of transmitting a radio wave, which is not limited in the present disclosure. The energy received by the wireless power receiving coil includes, but is not limited to, energy in a form of electromagnetic waves, microwaves, and the like.

In step 202, the wireless power receiving coil outputs energy to the AC-DC circuit in a form of alternating current.

In some embodiments, after receiving the energy transmitted by the wireless charging device, the wireless power receiving coil converts the energy into a corresponding alternating current according to the power of the energy, and outputs the alternating current to the AC-DC circuit.

In step 203, the AC-DC circuit converts the alternating current into a direct current.

In step 204, the AC-DC circuit outputs the direct current to the capacitor buck circuit.

In some embodiments, the capacitor buck circuit includes at least two capacitors and at least one switch, and the capacitor buck circuit controls the storage and output of the energy of the at least two capacitors by controlling the at least one switch to different connection states.

In step 205, the capacitor buck circuit controls the at least one switch to a first connection state.

In some embodiments, the at least two capacitors are in series state and store energy when the at least one switch is in the first connection state.

In step 206, the capacitor buck circuit controls the at least one switch to a second connection state.

In some embodiments, the at least two capacitors are in a parallel state when the at least one switch is in the second connection state and output energy to the battery in a form of an output current.

Accordingly, when the wireless charging method provided in this embodiment converts an alternating current into a direct current in the AC-DC circuit, and lowers the voltage of the direct current, through at least two capacitors and at least one switch in the capacitor buck circuit, the method controls processes of the at least two capacitors storing energy and releasing energy according to the connection states of the switch. It can avoid the problem of energy loss caused by the impedance of the inductor itself, and can improve the energy conversion efficiency and the charging efficiency in wireless charging.

Figure 3:
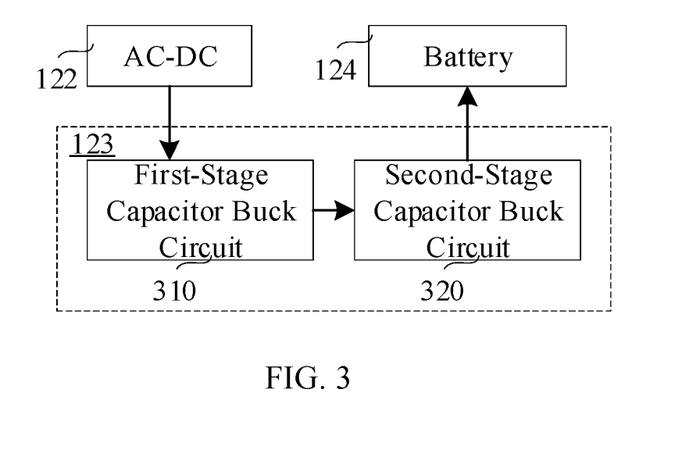
FIG. 3 is a structural block diagram of a capacitor buck circuit according to an exemplary embodiment of the present disclosure.

In an optional embodiment, as shown in FIG. 3, the capacitor buck circuit 123 includes a first-stage capacitor buck circuit 310 and a second-stage capacitor buck circuit 320.

The output terminal of the AC-DC circuit 122 is connected to an input terminal of the first-stage capacitor buck circuit 310, and an output terminal of the first-stage capacitor buck circuit 310 is connected to an input terminal of the second-stage capacitor buck circuit 320. An output terminal of the second capacitor buck circuit 320 is connected to the battery 124.

Figure 4:
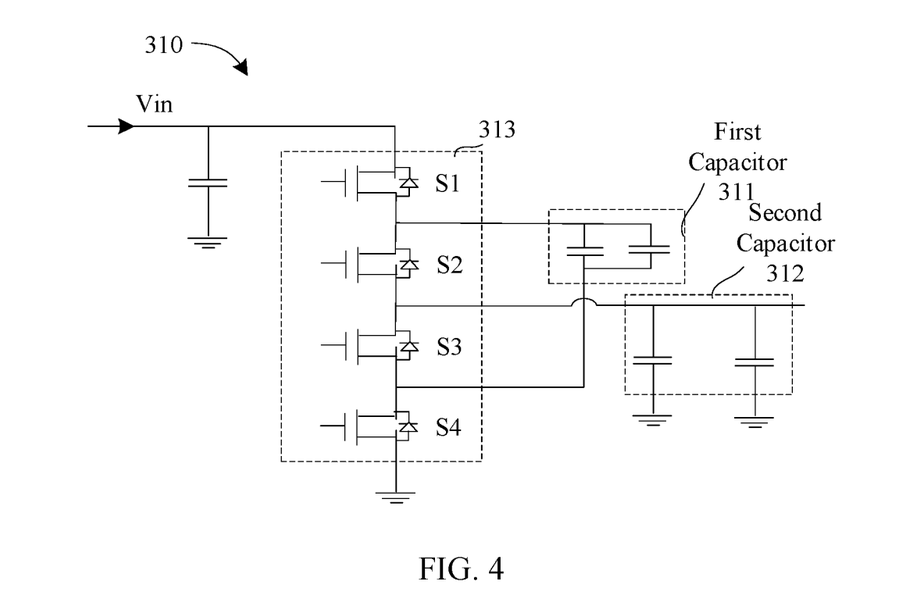
FIG. 4 is a structural block diagram of a first-stage capacitor buck circuit according to an exemplary embodiment of the present disclosure.

In some embodiments, as shown in FIG. 4, the first-stage capacitor buck circuit 310 includes a first capacitor 311, a second capacitor 312, and at least one first switch 313 (FIG. 4 illustrates the first-stage capacitor buck circuit 310 including 4 first switches 313 as an example).

Figure 5:
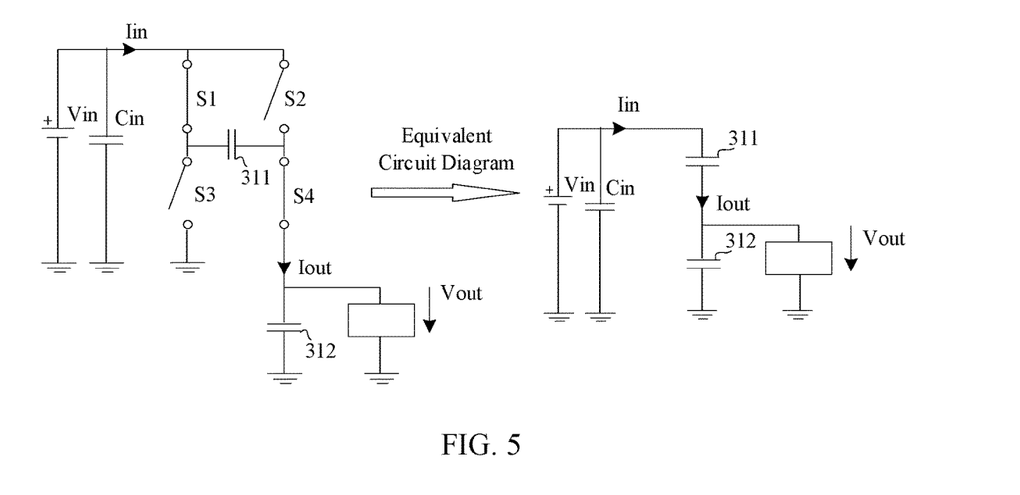
FIG. 5 is an equivalent circuit diagram of a first switch of a first-stage capacitor buck circuit in a first connection state according to an exemplary embodiment of the present disclosure.
Figure 6:
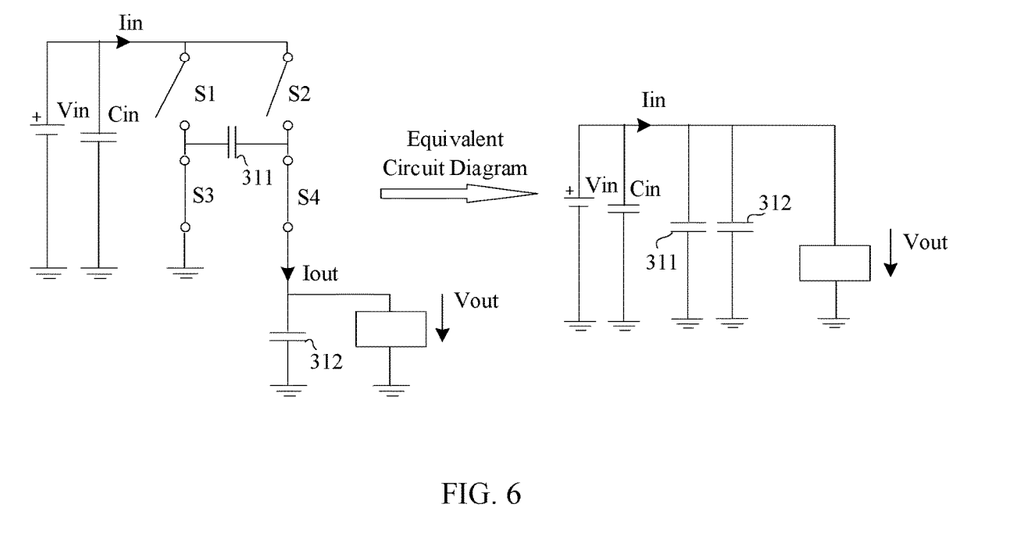
FIG. 6 is an equivalent circuit diagram of a first switch of a first-stage capacitor buck circuit in a second connection state according to an exemplary embodiment of the present disclosure.

In some embodiments, when the at least one first switch 313 is in the first connection state, the first capacitor 311 and the second capacitor 312 are in a series state, and when the at least one first switch 313 is in the second connection state, the first capacitor 311 and the second capacitor 312 is in a parallel state. As an example, referring to FIG. 4, the first switch 313 includes a switch S1, a switch S2, a switch S3, and a switch S4. When the switch S1 and the switch S4 are closed (i.e., in an on-state), and the switch S2 and the switch S3 are opened (i.e., in an off-state), the first capacitor 311 and the second capacitor 312 are in a series state. When the switch S3 and the switch S4 are closed, and the switch S1 and the switch S2 are opened, the first capacitor 311 and the second capacitor 312 are in a parallel state. As an example, when the switch S1 and the switch S4 are closed, the switch S2 and the switch S3 are opened, and the first capacitor 311 and the second capacitor 312 are in series state, the equivalent circuit is as shown in FIG. 5; when the switch S3, the switch S4 are closed and the switch S1 and the switch S2 are opened, and the first capacitor 311 and the second capacitor 312 are in parallel state, the equivalent circuit is as shown in FIG. 6.

In some embodiments, a first terminal of the second capacitor 312 is connected to the at least one first switch 313, and a second terminal of the second capacitor 312 is grounded.

In some embodiments, the capacitance values of the first capacitor 311 and the second capacitor 312 are the same. In some embodiments, as shown in FIG. 4, when the switch S1 and the switch S4 are closed, and the switch S2 and the switch S3 are opened, the first capacitor 311 and the second capacitor 312 are in a series state, since the first capacitor 311 and the second capacitor 312 have the same capacitance value, the voltage across the second capacitor 312 is equal to the voltage across the second capacitor 312, that is, the voltage across the second capacitor 312 is equal to half of the input voltage input to the first-stage capacitor buck circuit 310. The first capacitor 311 and the second capacitor 312 simultaneously store energy, and the stored energy has the same magnitude. When the switch S3 and the switch S4 are closed, the switch S1 and the switch S2 are opened, the first capacitor 311 and the second capacitor 312 are switched from the series state to the parallel state, and the first capacitor 311 and the second capacitor 312 store the same energy, the voltage across the first capacitor 311 or the voltage across the second capacitor 312 is the output voltage of the first-stage capacitor buck circuit 310, that is, half of the input voltage of the first-stage capacitor buck circuit 310. Therefore, after being converted into a parallel state, according to the law of conservation of energy, the first capacitor 311 and the second capacitor 312 release the stored energy, the output voltage of the first-stage capacitor buck circuit 310 is half of the input voltage, and the output current of the first-stage capacitor buck circuit 310 is twice of the input current.

Figure 7:
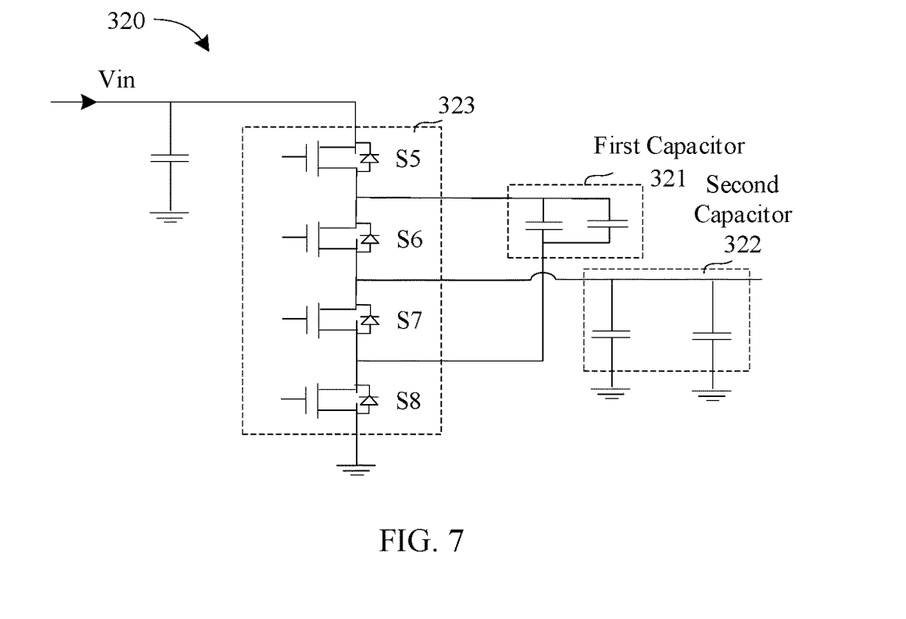
FIG. 7 is a structural block diagram of a second-stage capacitor buck circuit according to an exemplary embodiment of the present disclosure.

As shown in FIG. 7, the second-stage capacitor buck circuit 320 includes a third capacitor 321, a fourth capacitor 322, and at least one second switch 323 (FIG. 7 illustrates the second-stage capacitor buck circuit 320 including 4 second switch 323 as an example).

Figure 8:
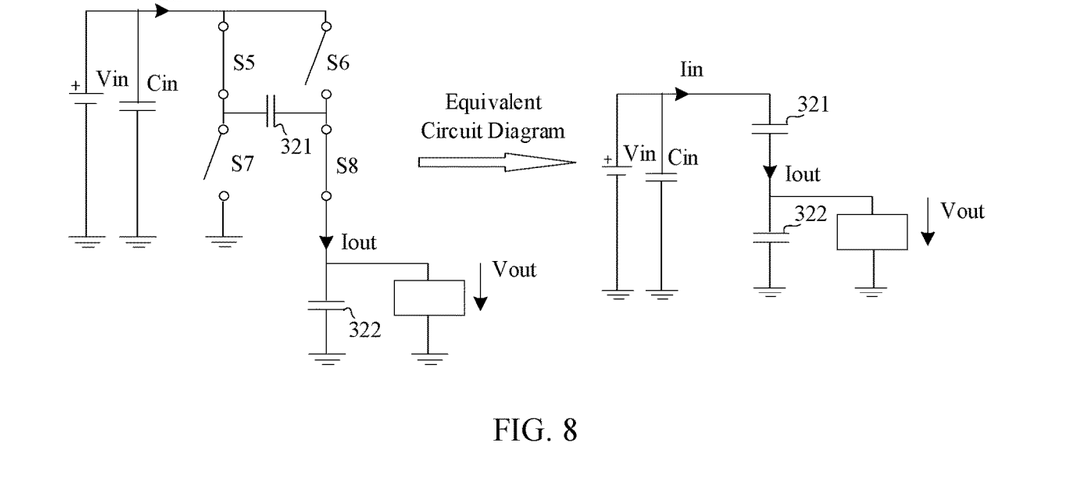
FIG. 8 is an equivalent circuit diagram of a second switch of a second-stage capacitive buck circuit in a first connection state according to an exemplary embodiment of the present disclosure.
Figure 9:
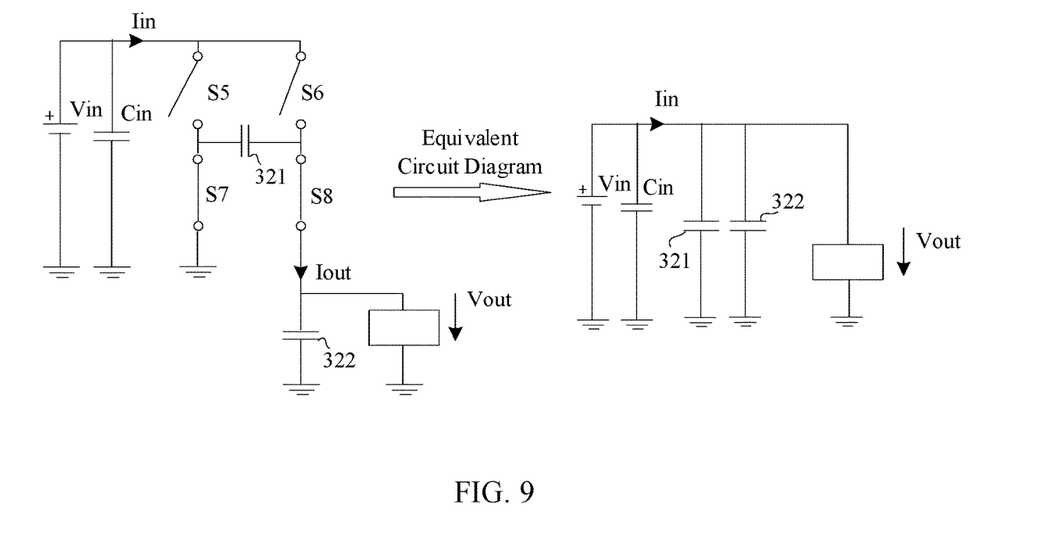
FIG. 9 is an equivalent circuit diagram of a second switch of a second-stage capacitor buck circuit in a second connection state according to an exemplary embodiment of the present disclosure.

In some embodiments, when the at least one second switch 323 is in the first connection state, the third capacitor 321 and the fourth capacitor 322 are in a series state, and when the at least one second switch 323 is in the second connection state, the third capacitor 321 and the fourth capacitor 322 are in a parallel state. As an example, referring to FIG. 7, the second switch 323 includes a switch S5, a switch S6, a switch S7, and a switch S8. When the switch S5 and the switch S8 are closed, the switch S6 and the switch S7 are opened, the third capacitor 321 and the fourth capacitor 322 are in a series state. When the switch S7 and the switch S8 are closed, and the switch S5 and the switch S6 are opened, the third capacitor 321 and the fourth capacitor 322 are in a parallel state. As an example, when the switch S5 and the switch S8 are closed, the switch S6 and the switch S7 are opened, and the third capacitor 321 and the fourth capacitor 322 are in series state, the equivalent circuit is as shown in FIG. 8; when the switch S7 and the switch S8 are closed, the switch S5 and the switch S6 are opened, and the third capacitor 321 and the fourth capacitor 322 are in parallel state, the equivalent circuit is as shown in FIG. 9.

In some embodiments, a first terminal of the fourth capacitor 322 is connected to the at least one second switch 323, and a second terminal of the fourth capacitor 322 is grounded.

In some embodiments, the capacitance values of the third capacitor 321 and the fourth capacitor 322 are the same. In some embodiments, as shown in FIG. 7, when the switch S5 and the switch S8 are closed, and the switch S6 and the switch S7 are opened, the third capacitor 321 and the fourth capacitor 322 are in a series state, since the third capacitor 321 and the fourth capacitor 322 have the same capacitance value, the voltage across the fourth capacitor 322 is equal to the voltage across the third capacitor 321, that is, the voltage across the fourth capacitor 322 is equal to half of the input voltage input to the second-stage capacitor buck circuit 320. The third capacitor 321 and the fourth capacitor 322 simultaneously store energy, and the stored energy has the same magnitude. When the switch S7 and the switch S8 are closed, the switch S5 and the switch S6 are opened, the third capacitor 321 and the fourth capacitor 322 are switched from the series state to the parallel state, and the third capacitor 321 and the fourth capacitor 322 store the same energy, the voltage across the third capacitor 321 or the voltage across the fourth capacitor 322 are the output voltage of the second-stage capacitor buck circuit 320, that is, half of the input voltage of the second-stage capacitor buck circuit 320. Therefore, after being converted into a parallel state, according to the law of conservation of energy, the third capacitor 321 and the fourth capacitor 322 release the stored energy, the output voltage of the second-stage capacitor buck circuit 320 is half of the input voltage, and the output current of the second-stage capacitor buck circuit 320 is twice of the input current.

In some embodiments, the input voltage of the first-stage capacitor buck circuit 310 is a first voltage, the input current thereof is a first current, the output voltage of the first-stage capacitor buck circuit 310 is a second voltage, and the output current thereof is a second current. The value of the second voltage is half of the value of the first voltage, and the value of the second current is twice the value of the first current.

In some embodiments, the output voltage of the second-stage capacitor buck circuit 320 is a third voltage, the output current thereof is a third current. The value of the third voltage is half of the value of the second voltage, and the value of the third current is twice of the value of the second current. That is, the value of the third voltage is a quarter of the value of the first voltage, and the value of the third current is four times of the value of the first current.

Figure 10:
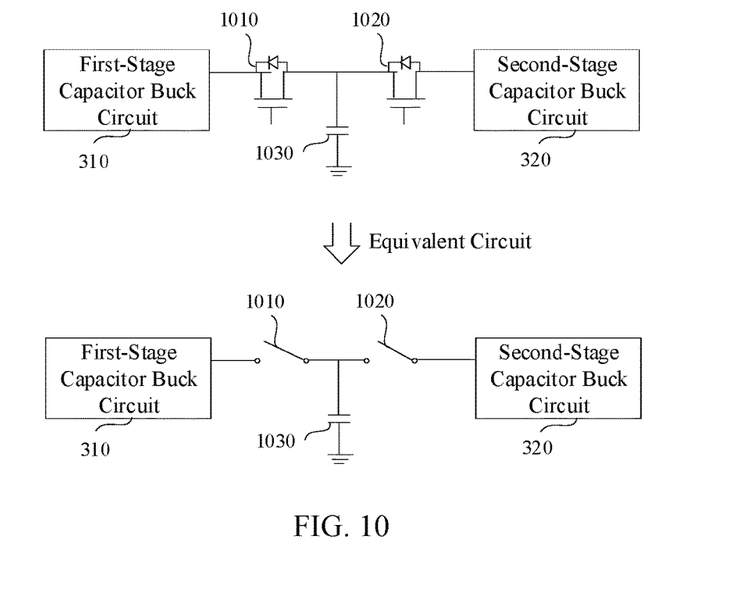
FIG. 10 is a structural block diagram of a capacitor buck circuit according to another exemplary embodiment of the present disclosure.

In an optional embodiment, as shown in FIG. 10, a third switch 1010, a fourth switch 1020, and a fifth capacitor 1030 are connected between the first-stage capacitor buck circuit 310 and the second-stage capacitor buck circuit 320.

The output terminal of the first-stage capacitor buck circuit 310 is connected to an input terminal of the third switch 1010, an output terminal of the third switch 1010 is connected to an input terminal of the fourth switch 1020, and an output terminal of the fourth switch 1020 is connected to the input terminal of the second-stage capacitor buck circuit 320. In some embodiments, the output terminal of the third switch 1010 and the input terminal of the fourth switch 1020 are connected to a first terminal of the fifth capacitor 1030, and a second terminal of the fifth capacitor 1030 is grounded.

As shown in FIG. 10, when the first-stage capacitor buck circuit 310 lowers the voltage by half, and increases the output current by two times, the third switch 1010 is closed, and the fourth switch 1020 is opened, the output energy is concentrated on the fifth capacitor 1030; and when the third switch 1010 is opened and the fourth switch 1020 is closed, energy is released to the second-stage capacitor buck circuit 320.

In the wireless power receiving device provided in this embodiment, a fifth capacitor, a third switch, and a fourth switch are provided between the first-stage capacitor buck circuit and the second-stage capacitor buck circuit, the fifth capacitor can function as an energy relay to store energy when the third switch is closed and the four switch is opened, and the energy in the fifth capacitor can be transferred to the second-stage capacitor buck circuit when the third switch is opened and the four switch is closed. Thus, it can avoid large energy output of the first-stage capacitor buck circuit causing impact on the second-stage capacitor buck circuit, affecting the energy transfer process.

In an optional embodiment, the wireless power receiving device 120 further includes a digital control circuit and a central processing unit (CPU), wherein a first terminal of the digital control circuit is connected to the central processing unit, and is communicated with the central processing unit through the connection. In some embodiments, a second terminal of the digital control circuit is connected to an output terminal of the AC-DC circuit 113, and a third terminal of the digital control circuit is connected to the capacitor buck circuit.

In some embodiments, when the capacitor buck circuit includes a first-stage capacitor buck circuit 310 and a second-stage capacitor buck circuit 320, the digital control circuit is connected respectively to the first-stage capacitor buck circuit 310 and the second-stage capacitor buck circuit 320.

In some embodiments, the digital control circuit is configured to communicate with a CPU or other core processor, the CPU sends control signaling to the digital control circuit, and the wireless charging process is controlled by the digital control circuit, and the charging state of the wireless charging process is reported to the CPU through digital control signaling.

As an example, when the wireless power receiving coil 121 of the wireless power receiving device 120 receives the coupling of the wireless charging coil 114 of the wireless charging device 110, the CPU sends control signaling to the digital control circuit, the control signaling is used to indicate that the energy emitted by the wireless charging device to the wireless power receiving device is within a preset energy range, and the digital control circuit enables the wireless charging process according to the received control signaling.

Figure 11:
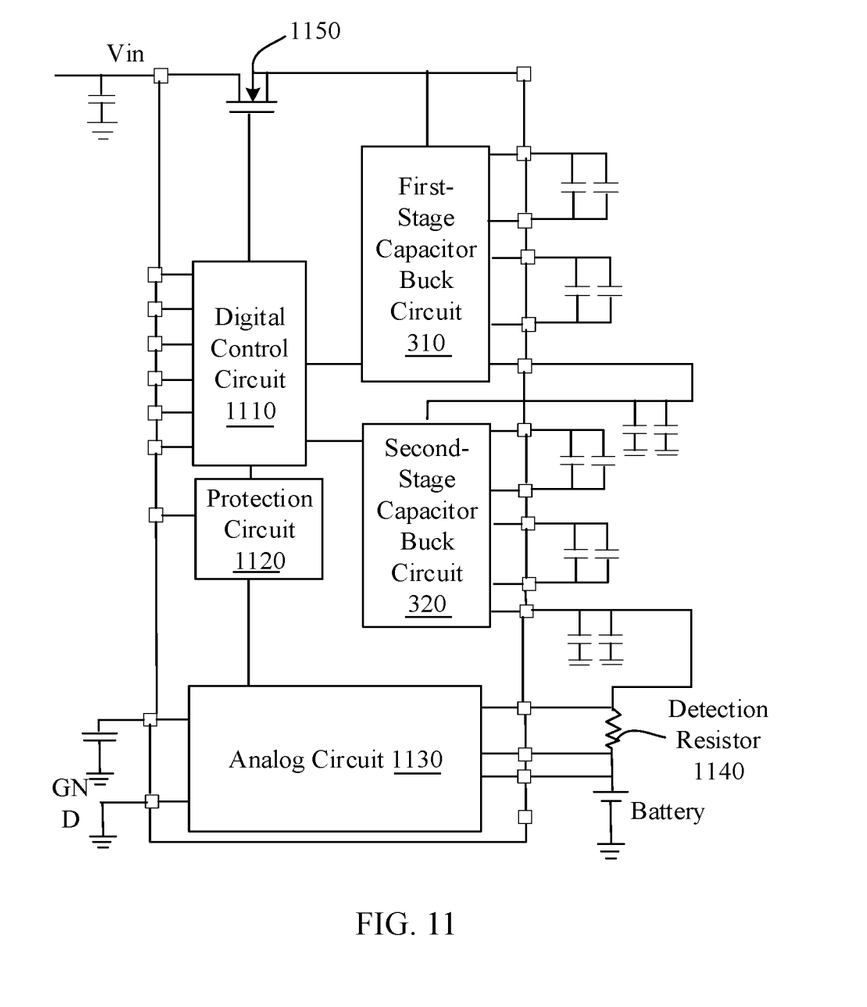
FIG. 11 is a structural block diagram of a wireless power receiving device according to an exemplary embodiment of the present disclosure.

In an optional embodiment, as shown in FIG. 11, the wireless power receiving device 120 further includes the digital control circuit 1110, the protection circuit 1120, the analog circuit 1130 and the detection resistor 1140 described above.

The output terminal of the second-stage capacitor buck circuit 320 is connected to the battery 124 via the detecting resistor 1140. That is, the output terminal of the second-stage capacitor buck circuit 320 is connected to an input terminal of the detecting resistor 1140, and an output terminal of the detecting resistor 1140 is connected to the battery 124.

A fourth terminal of the digital control circuit 1110 is connected to a first terminal of the protection circuit 1120, a second terminal of the protection circuit 1120 is connected to a first terminal of the analog circuit 1130, and a second terminal of the analog circuit 1130 is connected to the battery 124, and a third terminal of the analog circuit 1130 is connected to the detecting resistor 1140.

In some embodiments, the analog circuit 1130 is configured to detect an output voltage and an output current at the output terminal of the capacitor buck circuit, and detect the voltage of the battery 124 through the detecting resistor 1140. In some embodiments, the analog circuit 1130 is configured to detect an output voltage and an output current at the output terminal of the second-stage capacitor buck circuit 320.

In some embodiments, the protection circuit 1120 is configured to protect against overvoltage and overcurrent at the input terminal of the capacitor buck circuit, against overvoltage and overcurrent at the output terminal of the capacitor buck circuit, and against short circuit.

In some embodiments, as shown in FIG. 11, the wireless power receiving device 120 further includes a fifth switch 1150. A second terminal of the digital control circuit 1110 is connected to the output terminal of the AC-DC circuit 122 via the fifth switch 1150. The input terminal of the first-stage capacitor buck circuit 310 is connected to the output terminal of the AC-DC circuit 122 via the fifth switch 1150.

In some embodiments, since the fifth switch 1150 is a switch that connects the AC-DC circuit 122 and the first-stage capacitor buck circuit 310, the fifth switch 1150 can be switched to an off-state during a wireless charging process to end the wireless charging process.

In some embodiments, the protection circuit 1120 is configured to control the fifth switch 1150 to be switched to an off-state through the digital control circuit 1110 when an overvoltage occurs at the input terminal of the capacitor buck circuit 123. Alternatively, the protection circuit 1120 is configured to control the fifth switch 1150 to be switched to an off-state through the digital control circuit 1110 when an overcurrent occurs at the input terminal of the capacitor buck circuit 123. Alternatively, the protection circuit 1120 is configured to control the fifth switch 1150 to be switched to an off-state through the digital control circuit 1110 when an overvoltage occurs at the output terminal of the capacitor buck circuit 123. Alternatively, the protection circuit 1120 is configured to control the fifth switch 1150 to be switched to an off-state through the digital control circuit 1110 when an overcurrent occurs at the output terminal of the capacitor buck circuit 123.

It should be noted that each of the first switch 313, the second switch 323, the third switch 1010, the fourth switch 1020, and the fifth switch 1150 can be implemented as a MOS transistor switching circuit, and the MOS transistor switching circuit is a circuit constructed based on the principle of controlling the source electrode (s) and drain electrode (d) of the MOS transistor by the gate electrode (g) of the MOS transistor.

Accordingly, the wireless power receiving device provided by the present embodiment can protect the wireless charging process through a protection circuit, a detecting resistor, and an analog circuit, thereby avoiding an influence of overvoltage, overcurrent, or short circuit on the wireless charging process, which would otherwise result in danger in the charging. Thus, it can improve the safety of the wireless charging process.

Figure 12:
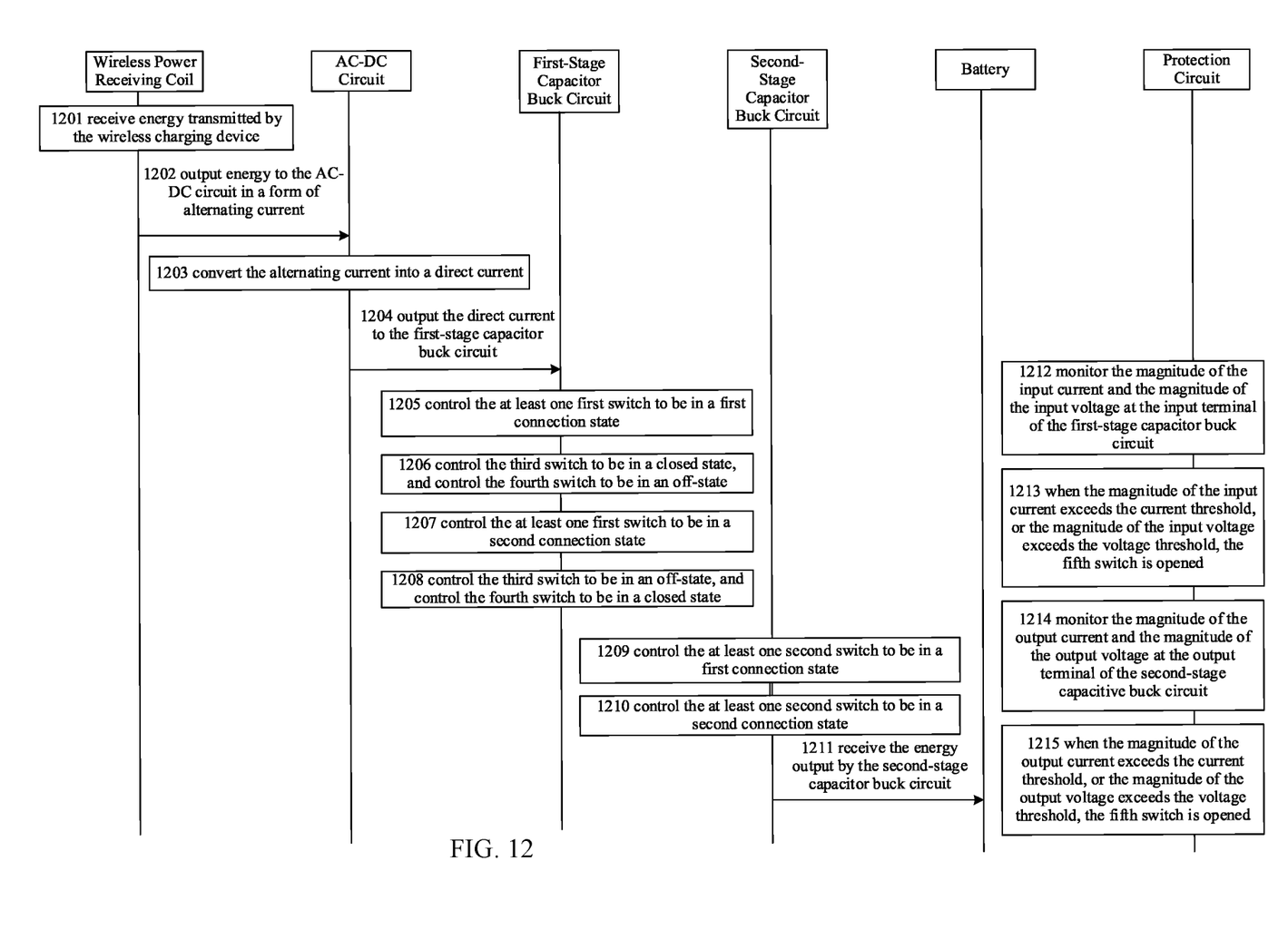
FIG. 12 is a flowchart of a wireless charging method according to another exemplary embodiment of the present disclosure.

With reference to the wireless power receiving device 120 shown in FIG. 11 above, FIG. 12 is a flowchart of a wireless charging method according to an exemplary embodiment of the present disclosure. As shown in FIG. 12, the method includes the following steps.

In step 1201, the wireless power receiving coil receives energy transmitted by the wireless charging device.

In some embodiments, the wireless power receiving coil may be a coupling coil capable of generating a magnetic coupling, a coupling coil capable of generating an electric field coupling, or a coil capable of transmitting a radio wave, which is not limited in the present disclosure. The energy received by the wireless power receiving coil includes, but is not limited to, energy in a form of electromagnetic waves, microwaves, and the like.

In step 1202, the wireless power receiving coil outputs energy to the AC-DC circuit in a form of alternating current.

In some embodiments, after receiving the energy transmitted by the wireless charging device, the wireless power receiving coil converts the energy into a corresponding alternating current according to the power of the energy, and outputs the alternating current to the AC-DC circuit.

In step 1203, the AC-DC circuit converts the alternating current into direct current.

In step 1204, the AC-DC circuit outputs the direct current to the first-stage capacitor buck circuit.

In some embodiments, the first-stage capacitor buck circuit includes a first capacitor, a second capacitor, and at least one first switch. The first-stage capacitor buck circuit controls the storage and output of the energy of the first and second capacitors by controlling the at least one switch to different connection states.

In step 1205, the first-stage capacitor buck circuit controls the at least one first switch to be in a first connection state.

In some embodiments, the first capacitor and the second capacitor are in a series state and store energy when the at least one first switch is in the first connection state.

In step 1206, the first-stage capacitor buck circuit controls the third switch to be in a closed state, and controls the fourth switch to be in an off-state.

In some embodiments, when the third switch is in the closed state and the fourth switch is in the off-state, the first-stage capacitor buck circuit can transmit energy to the fifth capacitor, and the fifth capacitor cannot transfer energy to the second-stage capacitor buck circuit.

In step 1207, the first-stage capacitor buck circuit controls the at least one first switch to be in a second connection state.

In some embodiments, the first capacitor and the second capacitor are in a parallel state and release energy when the at least one first switch is in the second connection state.

In some embodiments, the first-stage capacitor buck circuit transfers energy in the first capacitor and the second capacitor to the fifth capacitor.

In step 1208, the first-stage capacitor buck circuit controls the third switch to be in an off-state, and controls the fourth switch to be in a closed state.

In some embodiments, when the third switch is in the off-state and the fourth switch is in the closed state, the fifth capacitor releases energy outward according to a law of conservation of energy.

In step 1209, the second-stage capacitor buck circuit controls the at least one second switch to be in a first connection state.

In some embodiments, the third capacitor and the fourth capacitor are in a series state and store energy when the at least one first switch is in the first connection state.

In step 1210, the second-stage capacitor buck circuit controls the at least one second switch to be in a second connection state.

In some embodiments, the third capacitor and the fourth capacitor are in a parallel state and release energy when the at least one second switch is in the second connection state.

In step 1211, the battery receives the energy output by the second-stage capacitor buck circuit.

In some embodiments, the battery is charged by the received energy. In some embodiments, the output voltage of the second-stage capacitor buck circuit is one quarter of the input voltage of the first-stage capacitor buck circuit, and the current output by the second-stage capacitor buck circuit is four times of the input current of the first-stage capacitor buck circuit.

In step 1212, the protection circuit monitors the magnitude of the input current and the magnitude of the input voltage at the input terminal of the first-stage capacitor buck circuit.

In step 1213, when the magnitude of the input current exceeds the current threshold, or the magnitude of the input voltage exceeds the voltage threshold, the fifth switch is opened.

In some embodiments, when the fifth switch is opened, the wireless charging process is ended.

In step 1214, the protection circuit monitors the magnitude of the output current and the magnitude of the output voltage at the output terminal of the second-stage capacitive buck circuit.

In step 1215, when the magnitude of the output current exceeds the current threshold, or the magnitude of the output voltage exceeds the voltage threshold, the fifth switch is opened.

It should be noted that the above steps 1212 to 1215 can be performed at any position before, after, and between the above steps 1201 to 1211, and the execution sequence of the step 1212 to the step 1215 is not limited in the embodiment of the present disclosure.

Accordingly, when the wireless charging method provided in this embodiment converts an alternating current into a direct current in the AC-DC circuit, and lowers the voltage of the direct current, through at least two capacitors and at least one switch in the capacitor buck circuit, the method controls processes of the at least two capacitors storing energy and releasing energy according to the connection states of the switch. It can avoid the problem of energy loss caused by the impedance of the inductor itself, and can improve the energy conversion efficiency and the charging efficiency in wireless charging.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as some only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A wireless power receiving device, comprising: a wireless power receiving coil, an AC-DC circuit, a capacitor buck circuit, and a battery, wherein:
  the capacitor buck circuit comprises at least two capacitors and at least one switch;
  an output terminal of the wireless power receiving coil is connected to an input terminal of the AC-DC circuit, and an output terminal of the AC-DC circuit is connected to an input terminal of the capacitor buck circuit, and an output terminal of the capacitor buck circuit is connected to the battery;
  in a case that the at least one switch is in a first connection state, the at least two capacitors are in a series state and storing energy; and in a case that the at least one switch is in a second connection state, the at least two capacitors are in a parallel state and releasing energy, wherein the capacitor buck circuit comprises a first-stage capacitor buck circuit and a second-stage capacitor buck circuit;

the output terminal of the AC-DC circuit is connected to an input terminal of the first-stage capacitor buck circuit, and an output terminal of the first-stage capacitor buck circuit is connected to an input terminal of the second-stage capacitor buck circuit, and an output terminal of the second-stage capacitor buck circuit is connected to the battery, wherein the wireless power receiving device further comprises: a digital control circuit and a central processing unit;

wherein a first terminal of the digital control circuit is connected to the central processing unit and configured to communicate with the central processing unit through the connection;

a second terminal of the digital control circuit is connected to the output terminal of the AC-DC circuit, and a third terminal of the digital control circuit is connected to the capacitor buck circuit, and wherein the wireless power receiving device further comprises: a protection circuit, an analog circuit and a detecting resistor;

wherein the output terminal of the second-stage capacitor buck circuit is connected to the battery via the detecting resistor;

a fourth terminal of the digital control circuit is connected to a first terminal of the protection circuit, a second terminal of the protection circuit is connected to a first terminal of the analog circuit, and a second terminal of the analog circuit is connected to the battery, and a third terminal of the analog circuit is connected to the detecting resistor;

the analog circuit is configured to detect an output voltage and an output current of an output terminal of the capacitor buck circuit, and detect a voltage of the battery with the detecting resistor; and the protection circuit is configured to protect against overvoltage and overcurrent at the input terminal of the capacitor buck circuit, against overvoltage and overcurrent at the output terminal of the capacitor buck circuit, and against short circuit.

2. The wireless power receiving device according to claim 1, wherein the first-stage capacitor buck circuit comprises a first capacitor, a second capacitor, and at least one first switch, and the second-stage capacitor buck circuit comprises a third capacitor, a fourth capacitor, and at least one second switch;

in a case that the at least one first switch is in the first connection state, the first capacitor and the second capacitor are in the series state, when the at least one first switch is in the second connection state, the first capacitor and the second capacitor are in a parallel state;

in a case that the at least one second switch is in the first connection state, the third capacitor and the fourth capacitor are in the series state, when the at least one second switch is in the second connection state, the third capacitor and the fourth capacitor are in the parallel state.

3. The wireless power receiving device according to claim 1, wherein a third switch, a fourth switch, and a fifth capacitor are connected between the first-stage capacitor buck circuit and the second-stage capacitor buck circuit;

the output terminal of the first-stage capacitor buck circuit is connected to an input terminal of the third switch, an output terminal of the third switch is connected to an input terminal of the fourth switch, and an output terminal of the fourth switch is connected to the input terminal of the second-stage capacitor buck circuit; and the output terminal of the third switch and the input terminal of the fourth switch are connected to a first terminal of the fifth capacitor, and a second terminal of the fifth capacitor is grounded.

4. The wireless power receiving device according to claim 1, further comprising a fifth switch;

wherein the second terminal of the digital control circuit is connected to the output terminal of the AC-DC circuit via the fifth switch;

the input terminal of the first-stage capacitor buck circuit is connected to the output terminal of the AC-DC circuit via the fifth switch.

5. The wireless power receiving device according to claim 4, wherein:

the protection circuit is configured to control the fifth switch to be switched to an off-state through the digital control circuit when an overvoltage occurs at the input terminal of the capacitor buck circuit;

or, the protection circuit is configured to control the fifth switch to be switched to an off-state through the digital control circuit when an overcurrent occurs at the input terminal of the capacitor buck circuit;

or, the protection circuit is configured to control the fifth switch to be switched to an off-state through the digital control circuit when an overvoltage occurs at the output terminal of the capacitor buck circuit;

or, the protection circuit is configured to control the fifth switch to be switched to an off-state through the digital control circuit when an overcurrent occurs at the output terminal of the capacitor buck circuit;

or, the protection circuit is configured to control the fifth switch to be switched to an off-state through the digital control circuit when a short circuit occurs in a charging circuit of the wireless power receiving device.

6. The wireless power receiving device according to claim 1, wherein an input voltage of the first-stage capacitor buck circuit is a first voltage, and an input current thereof is a first current;

an output voltage of the first-stage capacitor buck circuit is a second voltage, and an output current thereof is a second current, a value of the second voltage is half of a value of the first voltage, and a value of the second current is twice of a value of the first current.

7. The wireless power receiving device according to claim 6, wherein an output voltage of the second-stage capacitor buck circuit is a third voltage, an output current thereof is a third current, the third voltage is half of a value of the second voltage, and the third current is twice of a value of the second current.

8. A wireless charging system, comprising:

a wireless charging device; and a wireless power receiving device configured to receive energy transmitted by the wireless charging device, wherein the wireless power receiving device comprises a wireless power receiving coil, an AC-DC circuit, a capacitor buck circuit, and a battery, wherein the capacitor buck circuit comprises at least two capacitors and at least one switch;

an output terminal of the wireless power receiving coil is connected to an input terminal of the AC-DC circuit, and an output terminal of the AC-DC circuit is connected to an input terminal of the capacitor buck circuit, and an output terminal of the capacitor buck circuit is connected to the battery;

when the at least one switch is in a first connection state, the at least two capacitors are in a series state and storing energy; and when the at least one switch is in a second connection state, the at least two capacitors are in a parallel state and releasing energy, wherein the capacitor buck circuit comprises a first-stage capacitor buck circuit and a second-stage capacitor buck circuit;

the output terminal of the AC-DC circuit is connected to an input terminal of the first-stage capacitor buck circuit, and an output terminal of the first-stage capacitor buck circuit is connected to an input terminal of the second-stage capacitor buck circuit, and an output terminal of the second-stage capacitor buck circuit is connected to the battery, wherein the wireless power receiving device further comprises: a digital control circuit and a central processing unit;

wherein a first terminal of the digital control circuit is connected to the central processing unit and configured to communicate with the central processing unit through the connection;

a second terminal of the digital control circuit is connected to the output terminal of the AC-DC circuit, and a third terminal of the digital control circuit is connected to the capacitor buck circuit, wherein the wireless power receiving device further comprises: a protection circuit, an analog circuit and a detecting resistor;

wherein the output terminal of the second-stage capacitor buck circuit is connected to the battery via the detecting resistor;

a fourth terminal of the digital control circuit is connected to a first terminal of the protection circuit, a second terminal of the protection circuit is connected to a first terminal of the analog circuit, and a second terminal of the analog circuit is connected to the battery, and a third terminal of the analog circuit is connected to the detecting resistor;

the analog circuit is configured to detect an output voltage and an output current of an output terminal of the capacitor buck circuit, and detect a voltage of the battery with the detecting resistor; and the protection circuit is configured to protect against overvoltage and overcurrent at the input terminal of the capacitor buck circuit, against overvoltage and overcurrent at the output terminal of the capacitor buck circuit, and against short circuit.

9. The system of claim 8, wherein the wireless power receiving device is a mobile terminal and the wireless charging device is a charging base.

10. The system of claim 8, wherein the first-stage capacitor buck circuit comprises a first capacitor, a second capacitor, and at least one first switch, and the second-stage capacitor buck circuit comprises a third capacitor, a fourth capacitor, and at least one second switch;

in a case that the at least one first switch is in the first connection state, the first capacitor and the second capacitor are in the series state, when the at least one first switch is in the second connection state, the first capacitor and the second capacitor are in a parallel state;

in a case that the at least one second switch is in the first connection state, the third capacitor and the fourth capacitor are in the series state, when the at least one second switch is in the second connection state, the third capacitor and the fourth capacitor are in the parallel state.

11. The system of claim 8, wherein a third switch, a fourth switch, and a fifth capacitor are connected between the first-stage capacitor buck circuit and the second-stage capacitor buck circuit;

the output terminal of the first-stage capacitor buck circuit is connected to an input terminal of the third switch, an output terminal of the third switch is connected to an input terminal of the fourth switch, and an output terminal of the fourth switch is connected to the input terminal of the second-stage capacitor buck circuit; and the output terminal of the third switch and the input terminal of the fourth switch are connected to a first terminal of the fifth capacitor, and a second terminal of the fifth capacitor is grounded.

12. The system of claim 8, wherein the wireless power receiving device further comprises a fifth switch;

wherein the second terminal of the digital control circuit is connected to the output terminal of the AC-DC circuit via the fifth switch;

the input terminal of the first-stage capacitor buck circuit is connected to the output terminal of the AC-DC circuit via the fifth switch.

13. The system of claim 12, wherein the protection circuit is configured to control the fifth switch to be switched to an off-state through the digital control circuit when an overvoltage occurs at the input terminal of the capacitor buck circuit;

or, the protection circuit is configured to control the fifth switch to be switched to an off-state through the digital control circuit when an overcurrent occurs at the input terminal of the capacitor buck circuit;

or, the protection circuit is configured to control the fifth switch to be switched to an off-state through the digital control circuit when an overvoltage occurs at the output terminal of the capacitor buck circuit;

or, the protection circuit is configured to control the fifth switch to be switched to an off-state through the digital control circuit when an overcurrent occurs at the output terminal of the capacitor buck circuit;

or, the protection circuit is configured to control the fifth switch to be switched to an off-state through the digital control circuit when a short circuit occurs in a charging circuit of the wireless power receiving device.

* * * * *